June 10, 1952 L. J. BOBB 2,600,046
DEVICE UTILIZING ERASE HEAD IMPEDANCE TO VARY AMPLIFIER GAIN
Filed Nov. 24, 1947
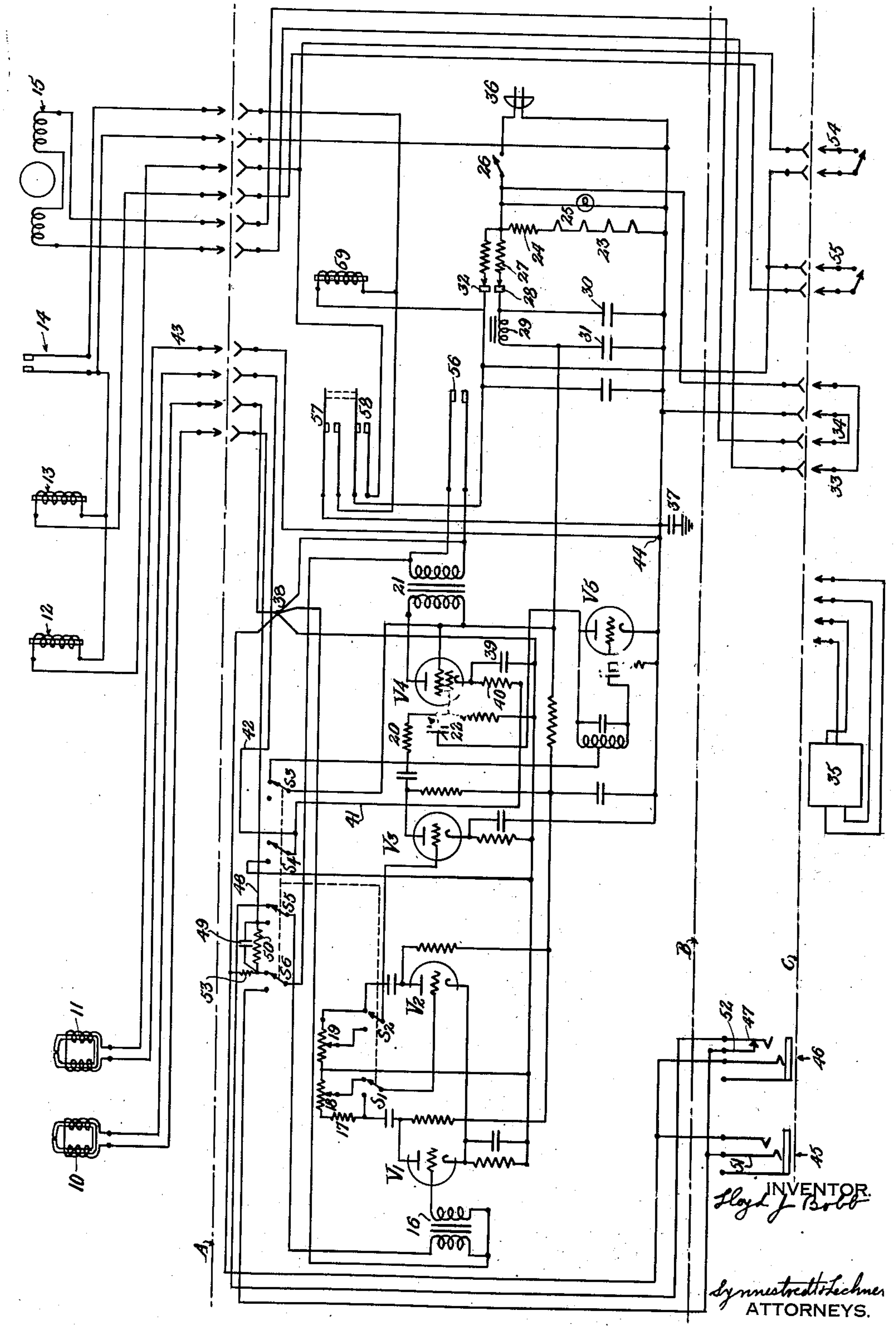
INVENTOR.
Lloyd J. Bobb
Synnestvedt & Lechner
ATTORNEYS.

Patented June 10, 1952

2,600,046

UNITED STATES PATENT OFFICE 2,600,046

DEVICE UTILIZING ERASE HEAD IMPEDANCE TO VARY AMPLIFIER GAIN

Lloyd J. Bobb, Glenside, Pa., assignor to The International Electronics Company, Philadelphia, Pa., a corporation of Pennsylvania Application November 24, 1947, Serial No. 787,645

5 Claims. (Cl. 179—100.2)

This invention relates to magnetic recording and reproducing apparatus and, more particularly, has to do with magnetic recording and reproducing apparatus adapted for use for office dictation and the like.

The present application relates to the circuits of office dictation equipment of the type disclosed in copending application Serial No. 717,754, filed December 21, 1946, and assigned to the assignee of the present invention; and copending application Serial No. 11,993, filed February 28, 1948, assigned to the assignee of the present invention and entitled Magnetic Recording Machine, although it is to be understood that the invention here disclosed is not limited to use with the apparatus of the said copending applications.

A general object of the present invention is to provide a simple and efficient arrangement of circuit elements for use in magnetic recording and reproducing apparatus.

A more particular object of the invention is to simplify the operation of magnetic recording and reproducing apparatus.

A still further object is to eliminate the necessity for readjusting the amplification of the apparatus each time a change is made from recording to reproducing conditions.

A further object is to provide for separate control of the amplification of the system during recording and reproducing.

Yet another object of the invention is to provide for flexible interchange of auxiliary equipment used with the apparatus of the invention, for example, microphones, loudspeakers, and the like.

Yet another object of the invention is to provide for erasing a magnetic record in a novel manner.

How the foregoing and other objects which will appear are attained will be understood upon reference to the description which follows and to the drawing.

In the drawing, I have not only illustrated an electronic circuit, but have included certain elements of the mechanical assembly of a magnetic recording and reproducing system of the type disclosed in the copending application last above mentioned. In the drawing, I have indicated by the dotted line A the division between the mechanical assembly and the electronic chassis of a magnetic recording system, the mechanical assembly being represented by that portion of the drawing above the line A. I have also included in the electronic chassis a terminal block to which various external connections may be made. This block is bounded in the drawings by the dotted lines B and C.

Considering first the elements of the mechanical assembly, attention is directed to a magnetic recording and reproducing head 10, an erasing head 11, a solenoid 12 for actuating back spacing mechanism, a second solenoid 13 for controlling the initiation and termination of scanning of a magnetic record, a direction-sensitive switch 14, and a magnetic record translating motor 15. The elements 10 through 15 are adapted to be electrically interconnected with the electronic chassis by means of separable connectors which may take any convenient form, but which I have illustrated as separate jacks, one for each conductor.

Turning now to the amplifier and its associated circuits, it will be seen that the input circuit includes a transformer 16, whose secondary is connected to the grid of a vacuum tube V–1. By means of a switch S–1, the output of V–1 is adapted to be applied to the grid V–2 either directly, when the switch is in the left-hand or listen position, or through a fixed resistor 17 and a volume control potentiometer 18 when the switch is in the right-hand or dictate position. Similarly, the output of V–2 is adapted to be applied to the grid of vacuum tube V–3 through a switch S–2 either directly, when the switch is in the right-hand position, or indirectly through a volume control potentiometer 19 when the switch is in the left-hand position. The output of V–3 is applied to the grid of V–4 through a fixed resistor 20, whose purpose will be described hereinbelow. The primary of an output transformer 21 is connected in the plate circuit of V–4.

The drawing also includes a fifth discharge tube V–5, arranged in an oscillator circuit whose output is adapted to be fed to the signal grid of V–4 through a variable coupling capacitor 22 simultaneously with the audio frequency signal from V–3.

As is more fully disclosed in my copending application Serial No. 787,644, filed concurrently herewith and entitled Magnetic Recording and Reproducing Circuits, the purpose of resistor 20 is to block the polarizing voltage generated by the oscillator from the circuits associated with V–3.

V–5 receives direct current plate potential through a switch S–3 only when the apparatus is adjusted for recording, and, therefore, it will be understood that no voltages of the polarizing frequency are fed to V–4 when the apparatus is adjusted for reproducing.

The filaments of the electron discharge tubes are adapted to be connected in series across the power line as indicated at 23. A resistor 24 is inserted in this circuit to reduce the current through the filaments to the proper value. A pilot lamp 25 is also placed across the power line at this point, and serves to indicate the condition of the apparatus as determined by the power switch 26.

Direct current potentials for the vacuum tubes are obtained from a rectifier-filter system comprising a series resistor 27, a metallic half-wave rectifier 28, for example, of the selenium disc type, a choke 29, and filter condensers 30 and 31. Direct currents for operation of the solenoids is obtained from a second rectifier 32.

Alternating current for the motor 15 is adapted to be derived from the alternating current power line through the jumpers indicated at 33 and 34 when the apparatus is connected to an alternating current main. While the amplifier and the rectifier filter systems are adapted for operation from alternating or direct current lines, the motor of the mechanical assembly is preferably an alternating current motor, and I have therefore provided for operation of the motor from direct current power mains through the use of an inverter, indicated by a block 35, which is adapted to be connected into the circuit in place of jumpers 33 and 34. This inverter is adapted to convert the direct current appearing at the power input plug 36 to alternating current for the operation of motor 15, while permitting the amplifier to be energized directly from the direct current mains. Thus, the amplifier supply is free from inverter ripple, which would otherwise complicate the circuits due to the high amplification required in magnetic reproducing systems.

Due to the fact that the power supply employed is a "transformerless" system, the various return circuits must be made to one side of the power line. To avoid personnel hazards, therefore, return circuits are made through a common conductor which is connected to the chassis through a capacitor 37. In addition, because of the relatively high amplification required during reproduction, certain of the return circuits are made to the same physical point 38 to avoid interstage coupling effects due to potential drops along the conductor.

Operating potentials for the various electron discharge tubes are derived from the rectifier-filter system in the conventional manner, with the exception of the arrangement of the circuits associated with V–4. The cathode circuit of V–4 includes a cathode by-pass capacitor 39 providing a path for alternating currents from the common conductor to the cathode of V–4. The direct cathode current flows through a cathode dropping resistor 40 and thence through a conductor 41 to a switch S–4, which, when the switch is in the left-hand or listen position, is connected to the common conductor and thus provides grid bias for V–4 in the usual manner by virtue of the potential drop across resistor 40. When switch S–4 is adjusted to the dictate or right-hand position, however, the cathode return circuit is through a conductor 42, erase head 11, and thence by a second conductor 43 to the common conductor at the point 44. Thus, when the apparatus is adjusted for recording, the cathode current of V–4 flows through erase head 11 and develops therein a magnetic field for saturating the magnetic recording medium. The potential drop introduced by head 11 increases the grid bias of V–4 during recording and thus reduces the amplification of the signal during this phase of operation. It will be seen, therefore, that this method of obtaining recording current also achieves a reduction in the overall amplification during recording, which is desirable in view of the relatively large output of the external transducer as compared with the output of the magnetic head during reproduction.

In addition to the elements of the circuit so far discussed, I have provided input and output inverting switches S–5 and S–6. As will be seen, one side of the primary of transformer 16 and of the secondary of transformer 21 is connected to the common conductor at point 38. In addition, one conductor from each of jacks 45 and 46, and one side of magnetic recording-reproducing head 10 is connected to this point. The "high" side of the input transformer primary is connected to the moving contact of switch S–5, which is adapted, when the apparatus is adjusted for recording, to be in connection with contact 47 of jack 46. When switch S–5 is adjusted to the play back position, the high side of the input circuit is connected to the high side of magnetic head 10 through conductor 48.

Similarly, the moving contact of switch S–6 is connected to the high side of the output transformer secondary and is adapted, when the apparatus is adjusted for recording, to connect the output transformer to head 10 through a filter comprising capacitor 49 and resistor 50. This filter is of the type disclosed in my copending application, Serial No. 787,644, filed concurrently herewith, and entitled Magnetic Recording and Reproducing Circuits. When switch S–6 is adjusted to the play back position, the high side of the output transformer secondary is connected to the contact 51 of jack 45 and the switch contact 52 of jack 46.

It should perhaps be noted at this time that the output end of the filter comprising capacitor 49 and resistor 50 is connected with the common conductor through a bleeder resistor 53, of very high resistance, whose function is disclosed in my copending application last mentioned.

Certain other elements disclosed in the drawing should now be described, including a back space switch 54, which is adapted to be inserted in the circuit of solenoid 12 to provide for control of the back spacing function of the equipment. This switch may be either a hand switch or a foot switch, and, as indicated in the drawing, is removably connected with the apparatus. A second switch 55, which may also be either hand or foot operated, or mounted on a microphone, is separably connected to the apparatus in a manner to provide control of solenoid 13 which, as was above stated, controls the scanning mechanism of the magnetic recording and reproducing apparatus. I have also illustrated in the drawing a mute switch 56, which is adapted to shunt the output transformer secondary during the manipulation of certain of the controls to silence the apparatus. In addition, a pair of ganged switches 57 and 58 and a solenoid 59, together with direction-sensitive switch 14, perform certain control interlock functions which are disclosed in copending application Serial No. 11,993, filed February 28, 1948, assigned to the assignee of the present invention and entitled Magnetic Recording Machine. Since they play no part in the present invention, these elements are not further described herein.

According to the invention, switches S–1, S–2,

S-3, S-4, S-5 and S-6 are adapted to be operated simultaneously to adjust the apparatus between the two conditions of recording and reproduction. The jacks 45 and 46 are arranged to provide for the use alternatively either of a single external transducer, which is adapted to operate both as a microphone and as a loudspeaker, or for the use of two external transducers, one of which performs each of these functions.

Considering first the simplest mode of operation of the apparatus, assume that a small loudspeaker-microphone of the moving coil type is connected to the apparatus by means of a plug inserted in jack 45. No plug is in jack 46, and, accordingly, switch contact 52 is in engagement with jack contact 47, and, therefore, contact 51 of jack 45 will be connected to both switches S-5 and S-6. The loudspeaker will, therefore, be connected alternatively to the input and output terminals of the amplifier in accordance with the position of these switches. In addition, the magnetic head 10 will be connected to the opposite terminal. Assuming that the ganged switches be in the recording position, the loudspeaker will be connected to the input of the amplifier and will function as a microphone, the head will be connected to the output of the amplifier through switch section S-6, the cathode return circuit of V-4 will be through erasing head 11, with the result that this head will be energized, and oscillator tube V-5 will be energized through switch section S-3. Switch section S-1 will connect the grid of V-2 to volume control potentiometer 18, and switch section S-2 will connect the grid of V-3 directly to the output of V-2. Since fixed resistor 20 is in series with volume control potentiometer 18, the relatively large signal from the external transducer may be effectively reduced to a value which will not overload V-2 and which will spread the desirable volume range out over the physical range of adjustment of potentiometer 18 to give non-critical control of the amplification.

When the apparatus is adjusted for reproducing, switch sections S-3 and S-4 will deenergize oscillator discharge tube V-5 and erasing head 11 respectively. Switch sections S-5 and S-6 will invert the previously existing connections to the input and output of the amplifier. Switch section S-1 will connect the grid of V-2 directly to the output of V-1, eliminating both fixed resistor 20 and potentiometer 18, while the grid of V-3 will be connected to the output of V-2 through volume control potentiometer 19. As a consequence, amplification during the reproduction phase of operation is controlled in the grid circuit of V-3, at which point the amplitude of the signal from the magnetic recording head, after having passed through two stages of voltage amplification, is at a level appropriate to non-critical control.

All of the above discussion was predicated upon the connection to the apparatus of a single external transducer. If, now, in addition to the loudspeaker connected through jack 45, a microphone or other transducer be connected to the apparatus by means of a plug inserted in jack 46, contacts 47 and 52 will be separated, with the result that jack 45 will no longer be in connection with the input circuit of the amplifier under either condition of adjustment of switches S-5 and S-6. On the other hand, jack 46 is in connection only with the input circuit. Accordingly, by simply inserting a microphone in the jack 46, the operator of the equipment may provide for the use of specialized transducers for the two functions.

It should also be pointed out that the use of the two volume controls above described not only provides for the non-critical control of amplification when the amplifier is energized by signals of widely different amplitude, but also provides for the separate and permanent adjustment of the apparatus for each of the two conditions, so that the operator of the apparatus, after having once found the most desirable adjustment of the apparatus, is not required to readjust each time he changes from dictation to play back and the reverse.

It should be pointed out that the control of amplification by one potentiometer located at the position of potentiometer 18 during both reproduction and recording is disadvantageous, as the signal from the magnetic head in this case would be too small for smooth control, while if the single control were inserted at the position of potentiometer 19, the signal from the speaker-microphone would overload V-2 under some conditions of operation.

In addition to the advantages arising out of each of the features of the invention which have been discussed above, it will be apparent that the employment of separate controls for recording and reproduction is particularly important when the apparatus is adapted to be used with a plurality of external transducers. Thus, when shifting from operation with a speaker-microphone to operation with an additional separate microphone, it is only necessary, with the apparatus of the invention, to readjust the recording volume control.

It should also be noted that energizing the erasing head during the recording operation by inserting it in the cathode circuit of one of the amplifier discharge tubes concurrently reduces the amplifier output by increasing the grid bias on that tube, and, thus, in addition to providing an economical source of energizing current for the head, further aids in altering the overall amplifier gain when shifting from one condition of operation to the other.

Thus, according to the invention, I have provided extremely flexible means for connecting the apparatus to external transducers, have arranged the power supply circuits for the motor and amplifier in a manner to provide direct current for the amplifier and alternating current for the motor regardless of the nature of the electrical energy available, and, finally, have coordinated with the input and output switching arrangements an integrated system for modifying the amplifier characteristics according to the operating condition selected. As a consequence, a magnetic recording and reproducing system constructed in accordance with the invention is adapted to respond to a wide variety of operating demands under widely varying operating conditions.

I claim:

1. In a magnetic recording system, a discharge tube for amplifying signals to be recorded, said tube comprising at least two elements between which a space current flows, an electromagnetic erasing head having a winding in series with a circuit including said two elements and providing a path for a uni-directional component of said space current whereby to provide for the generation of a uniform magnetic erasing field, and means shunting said winding and providing a path for the signal component of said space current.

2. In a magnetic recording system, a discharge tube for amplifying a signal to be recorded, said tube having at least cathode and anode electrodes between which a space current flows, an electromagnetic erasing head connected between said cathode electrode and a point of fixed potential to provide a path for uni-directional current between said point and cathode, and a capacitor shunting said erasing head and providing a path for alternating current between said point and cathode.

3. In a magnetic recording and reproducing system, switch means for alternatively conditioning the system for recording and reproducing, an amplifying electron discharge tube having a cathode, a capacitor providing an alternating current path to said cathode, an electromagnetic erasing head providing a direct current path to said cathode, a conductor for providing an independent path to said cathode, and second switch means for making a direct current connection to said cathode alternatively through said head and said conductor.

4. A system in accordance with claim 3 in which said second switch means is ganged with said first switch means.

5. A magnetic recording and reproducing system for use with an external signal source having a relatively high output level, comprising a magnetic recording and reproducing head having a voltage output level, on reproduction, lower than the level of signals to be recorded, a recording and reproducing amplifier comprising an amplifying discharge tube having a cathode, a magnetic erasing head, first switch means for alternatively conditioning the system for recording and reproducing, and second switch means ganged with the first for selectively connecting the erasing head in the direct current path to said cathode to simultaneously energize said erasing head and reduce the amplification of a signal by said discharge tube when the system is conditioned for recording.

LLOYD J. BOBB.

REFERENCES CITED

The following references are of record in the file of this patent:

UNITED STATES PATENTS

| Number | Name | Date |
|---|---|---|
| Re. 19,583 | Salcedo | May 21, 1935 |
| 1,396,745 | Haddock | Nov. 15, 1921 |
| 1,459,202 | Fuller | June 19, 1923 |
| 2,186,500 | Shnell | Jan. 9, 1940 |
| 2,234,132 | Woolridge | Mar. 18, 1941 |
| 2,281,793 | Patrick | May 5, 1942 |
| 2,351,009 | Camras | June 13, 1944 |
| 2,379,548 | Squire | July 3, 1945 |

OTHER REFERENCES

Rider: "Trouble Shooter's Manual," vol. XI, pages 11–62, G. E.